(12) United States Patent
Johnson

(10) Patent No.: US 11,602,422 B2
(45) Date of Patent: Mar. 14, 2023

(54) CHASSIS OF AN ORAL CLEANSING DEVICE

(71) Applicant: WATER PIK, INC., Fort Collins, CO (US)

(72) Inventor: Jeremy James Johnson, Fort Collins, CO (US)

(73) Assignee: WATER PIK, INC., Fort Colins, CO (US)

( * ) Notice: Subject to any disclaimer, the term of this patent is extended or adjusted under 35 U.S.C. 154(b) by 439 days.

(21) Appl. No.: 16/852,190

(22) Filed: Apr. 17, 2020

(65) Prior Publication Data

US 2021/0322142 A1 Oct. 21, 2021

(51) Int. Cl.
*A61C 17/22* (2006.01)
*A61C 17/36* (2006.01)

(52) U.S. Cl.
CPC ............ *A61C 17/227* (2013.01); *A61C 17/36* (2013.01)

(58) Field of Classification Search
CPC ..... A61C 17/225; A61C 17/227; A61C 17/26; A61C 17/34; A46B 13/02
See application file for complete search history.

(56) References Cited

U.S. PATENT DOCUMENTS

| | | | | |
|---|---|---|---|---|
| 1,064,307 | A * | 6/1913 | Fleming | A61M 3/0279 604/161 |
| 5,195,427 | A * | 3/1993 | Germano | F04B 35/04 206/524.8 |
| 7,770,822 | B2 * | 8/2010 | Leber | B05B 15/68 239/281 |
| 8,943,634 | B2 | 2/2015 | Sokol et al. | |
| 9,144,477 | B2 | 9/2015 | Sokol et al. | |
| 9,468,511 | B2 * | 10/2016 | Garrigues | A61C 17/3481 |
| 9,980,793 | B2 | 5/2018 | Wagner et al. | |
| 9,987,109 | B2 | 6/2018 | Sokol et al. | |
| 10,449,023 | B2 | 10/2019 | Wagner | |
| 10,610,008 | B2 | 4/2020 | Wagner et al. | |

* cited by examiner

*Primary Examiner* — David P Angwin
*Assistant Examiner* — Bradley S Oliver

(57) ABSTRACT

A chassis of an oral cleansing device is provided. The oral cleansing device may include a first chassis half including a first threaded portion, a second chassis half including a second threaded portion, and a nut threaded onto the first threaded portion and the second threaded portion to at least partially secure the first chassis half to the second chassis half. The threaded portions may be defined on respective ends of the first chassis half and the second chassis half. The nut may engage chamfered edges of the first chassis half and the second chassis half. Engagement of the nut with the first chamfered edge and the second chamfered edge may produce a radial compressive force on the chassis halves. The first chassis half and the second chassis half may at least partially define a chassis that is positioned within a handle of the oral cleansing device.

20 Claims, 4 Drawing Sheets

CHASSIS OF AN ORAL CLEANSING DEVICE

TECHNICAL FIELD

One or more embodiments of the present disclosure relate generally to oral cleansing devices and more particularly, for example, to a chassis of an oral cleansing device.

BACKGROUND

Some oral cleansing devices, such as electric toothbrushes and/or combination units that provide a toothbrush function and an irrigating function, include a two-piece chassis secured together using fasteners (e.g., screws, nuts and bolts, etc.) at discrete locations along the length of the chassis. This fastening method may be undesirable for many reasons, including, but not limited to, creating high localized stresses at the attachment regions and creating non-uniform and/or insufficient clamping forces within the chassis, among others. This fastening method may also require larger housing dimensions to accommodate the attachment elements/structure, which may limit the number of possible handle designs.

Therefore, there is a need in the art for a chassis of an oral cleansing device that addresses the deficiencies noted above, other deficiencies known in the industry, or at least offers an alternative to current techniques.

SUMMARY

According to one or more embodiments of the present disclosure, an oral cleansing device is provided. The oral cleansing device may include a first chassis half, a second chassis half, and a nut. The first chassis half may include a first threaded portion. The second chassis half may include a second threaded portion. The nut may be threaded onto the first threaded portion and the second threaded portion to at least partially secure the first chassis half to the second chassis half.

According to one or more embodiments of the present disclosure, an oral cleansing device is provided. The oral cleansing device may include a handle and a chassis positioned within the handle. The chassis may include a first chassis half, a second chassis half, and a nut. The first chassis half may include a first end with a first threaded portion. The second chassis half may include a second end with a second threaded portion. The nut may be threaded to the first threaded portion and the second threaded portion to secure the first end of the first chassis half to the second end of the second chassis half.

According to one or more embodiments of the present disclosure, a chassis for an oral cleansing device is provided. The chassis may include a first chassis half, a second chassis half, and a nut. The first chassis half may include a first end with a first threaded portion. The second chassis half may include a second end with a second threaded portion. The first threaded portion and the second threaded portion may together define a threaded structure. The nut may be threaded onto the threaded structure to secure the first end of the first chassis half to the second end of the second chassis half.

Additional features are set forth in part in the description that follows and will become apparent to those skilled in the art upon examination of the specification and drawings or may be learned by the practice of the disclosed subject matter. A further understanding of the nature and advantages of the present disclosure may be realized by reference to the remaining portions of the specification and the drawings, which forms a part of this disclosure.

One of skill in the art will understand that each of the various aspects and features of the disclosure may advantageously be used separately in some instances, or in combination with other aspects and features of the disclosure in other instances. Accordingly, individual aspects can be claimed separately or in combination with other aspects and features. Thus, the present disclosure is merely exemplary in nature and is in no way intended to limit the claimed invention or its applications or uses. It is to be understood that structural and/or logical changes may be made without departing from the spirit and scope of the present disclosure.

The present disclosure is set forth in various levels of detail and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. Moreover, for the purposes of clarity, detailed descriptions of certain features will not be discussed when they would be apparent to those with skill in the art so as not to obscure the description of the present disclosure. The claimed subject matter is not necessarily limited to the arrangements illustrated herein, with the scope of the present disclosure is defined only by the appended claims.

BRIEF DESCRIPTION OF THE DRAWINGS

The description will be more fully understood with reference to the following figures in which components may not be drawn to scale, which are presented as various embodiments of the oral cleansing device described herein and should not be construed as a complete depiction of the scope of the oral cleansing device.

Embodiments of the disclosure and their advantages are best understood by referring to the detailed description that follows. It should be appreciated that like reference numerals are used to identify like elements illustrated in one or more of the figures.

DETAILED DESCRIPTION

According to the present disclosure, a chassis for an oral cleansing device is provided that improves the attachment of pieces of the chassis. For example, each of a first chassis half and a second chassis half may include a threaded portion that combine to define a thread for engagement with a nut, such that screwing the nut onto the thread defined by the first chassis half and the second chassis half secures the first chassis half to the second chassis half. The nut may be tightened against a chamfer or chamfered edge on each of the first chassis half and the second chassis half to wedge the first chassis half and the second chassis half together, such as functioning as a taper lock. Tightening the nut against the first chassis half and the second chassis half may create a radial compressive force against the first chassis half and the second chassis half to secure the chassis halves together.

Figure 1:
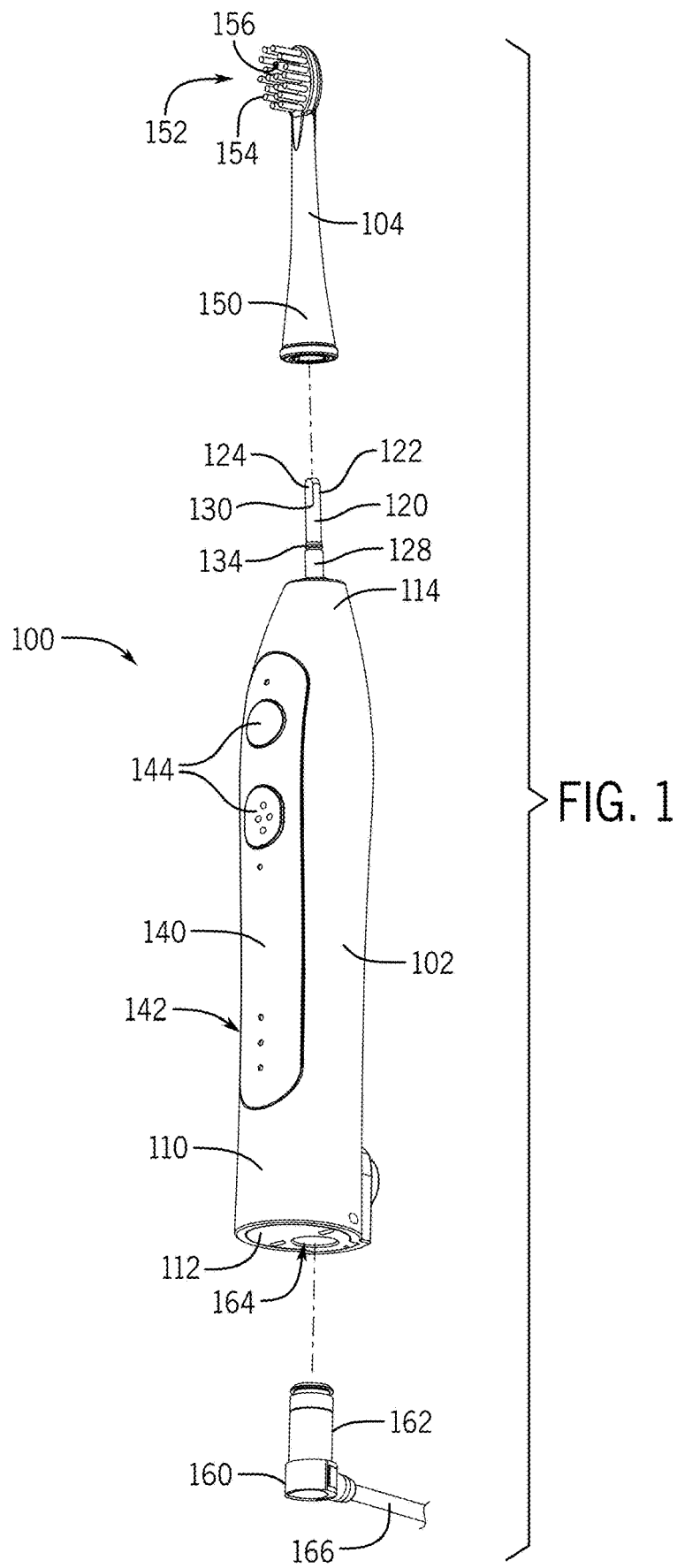
FIG. 1 is an isometric, partially exploded view of an oral cleansing device in accordance with an embodiment of the disclosure.

FIG. 1 is an isometric, partially exploded view of an oral cleansing device 100 in accordance with an embodiment of the disclosure. The oral cleansing device 100 may include many configurations. For example, the oral cleansing device 100 may be in the form of a handheld device and include a handle 102 and a brush head 104. Depending on the application, the oral cleansing device 100 may be a toothbrush, an oral irrigator, a combination of a toothbrush and an oral irrigator, or any other handheld device designed for oral care. For example, in the embodiment illustrated in FIG. 1, the oral cleansing device 100 is an irrigating toothbrush having both a brushing function and an irrigating function. In other embodiments, however, the oral cleansing device 100 may be an electric toothbrush, a handheld oral irrigator, or other device with a cleaning attachment. In such embodiments, "brush head" may refer to any cleaning attachment that is securable to the handle 102 without intent to limit.

The handle 102 may include many configurations. For example, the handle 102 may be defined by a housing 110 that extends between a base end 112 and a brush end 114. The housing 110 may be generally cylindrical in shape to ergonomically fit in the hand of a user, although the housing 110 may be formed in any other desirable ergonomic shape. In some embodiments, the cylindrical shape of the housing 110 may taper in the direction of the brush end 114 to define a smooth transition or taper to the brush head 104. The base end 112 of the housing 110 may be generally flat such that the handle 102 may be stood upright on a level surface.

As shown, the handle 102 may include a drive shaft 120 extending from the brush end 114 of the housing 110 to drive operation of the brush head 104. For example, the drive shaft 120 may oscillate to cause corresponding oscillation of the brush head 104. In such embodiments, the oral cleansing device 100 may include a power train assembly coupled to the drive shaft 120. The power train assembly may include many configurations operable to oscillate the drive shaft 120 and the brush head 104 connected thereto. An example of a power train assembly that may drive the drive shaft 120 is shown and described in U.S. Pat. No. 10,449,023 entitled "Oral Cleansing Device with Energy Conservation," which is incorporated herein in its entirety for all purposes, although other configurations are contemplated.

The drive shaft 120 may include one or more features facilitating attachment of the brush head 104 to the drive shaft 120. For example, the drive shaft 120 may include a tip 122 with a flat 124 defined thereon. In such embodiments, the tip 122 may include a non-circular cross-sectional shape that mates, at least partially, with a correspondingly-shaped structure of the brush head 104 to rotationally couple the brush head 104 to the drive shaft 120. The drive shaft 120 may include a base 128 having a circular or substantially circular cross-section. In such embodiments, a shoulder 130 may be defined at a transition between the non-circular cross-sectional shape of the tip 122 and the circular cross-sectional shape of the base 128. The brush head 104 may engage the shoulder 130 to define a fully inserted or seated position of the brush head 104 on the drive shaft 120. In some embodiments, the drive shaft 120 may include a groove 134 defined circumferentially around its base 128 to axially couple the brush head 104 to the drive shaft 120. For example, a retainer clip or other structure of the brush head 104 may engage the groove 134 to axially retain the brush head 104 to the drive shaft 120.

In some embodiments, the handle 102 may include a faceplate 140 supported on the housing 110. Depending on the application, the faceplate 140 may be either a separate plate or an overmolded surface on the housing 110. The faceplate 140 may expose one or more status indicators 142 for indicating a mode or status of operation of the oral cleansing device 100. The status indicators 142 may be one or more light emitting diodes or the like. Example status indications may include low battery, charging, and fully charged battery. Example modes of operation may include low speed, high speed, and water flosser modes.

The handle 102 may include one or more control buttons 144 that control (e.g., selectively activate and deactivate) one or more functions and/or modes of the oral cleansing device 100. For example, the one or more control buttons 144 may control a brushing function and/or an irrigating function of the oral cleansing device 100. For instance, the one or more control buttons 144 may selectively activate and deactivate an oscillation of the brush head 104 associated with a brushing function of the oral cleansing device 100. In some embodiments, the one or more control buttons 144 may selectively control a water pressure and/or a pulse length of an irrigating function of the brush head 104. The number and function control of the control buttons 144 may be varied based on a desired functionality of the oral cleansing device 100. As shown, the control buttons 144 may be connected to the handle 102 or any other convenient location for the user. For example, the one or more control buttons 144 may be located within the faceplate 140 supported on the housing 110.

The brush head 104 may include various configurations to provide a brushing function and/or an irrigating function of the oral cleansing device 100. Unless otherwise provided, the brush head 104 may be similar to the brush assembly shown and described in U.S. Pat. No. 10,449,023. For instance, the brush head 104 may include a shaft 150 and one or more cleaning elements 152. Depending on the application, the one or more cleaning elements 152 may include a plurality of bristles 154 and/or a nozzle 156. As shown, the nozzle 156 may be embedded in the bristles 154, such as extending amongst the bristles 154 (e.g., within a center region or field of the bristles 154).

The brush head 104 may be removably connected to the handle 102. For instance, the shaft 150 of the brush head 104 may be removably connected to the drive shaft 120 of the handle 102. The removability of the brush head 104 may provide many benefits. For instance, the removability of the brush head 104 may allow a user to replace the brush head 104 as desired, such as when the brush head 104 reaches its useful end of life, is damaged, or is contaminated, among others. In addition, the removability of the brush head 104 may allow multiple users to hygienically use the same handle 102, with each user attaching a respective brush head 104 to the handle 102 for separate use.

In embodiments where the oral cleansing device 100 includes an irrigating function, the oral cleansing device 100 may include a fluid connector 160 for connecting the handle 102 to a fluid source. Depending on the application, the fluid connector 160 may be removably connected to the handle 102 or may be fixed to the handle 102. For example, the fluid connector 160 may be removable from the handle 102 to allow the oral cleansing device 100 to be operated without a fluid source (e.g., in a brush only mode) and/or allow easier storage and traveling. In such embodiments, the fluid connector 160 may include a tip 162 that is releasably inserted within an aperture 164 of the handle 102, such as defined within the base end 112 of the housing 110. In some embodiments, the fluid connector 160 may be rotationally coupled to the handle 102 such that the fluid connector 160 may rotate about an axis relative to the handle 102. The fluid connector 160 may be similar to the fluid connector shown and described in U.S. Pat. No. 10,449,023.

The fluid connector 160 may be in fluid communication with a reservoir and/or pumping system, such as via a hose 166, for pumping fluid through the oral cleansing device 100. An example of a pumping system that may be fluidically connected to the fluid connector 160 is shown and described in U.S. Pat. No. 8,641,649 entitled "Pump for Dental Water Jet," which is incorporated herein in its entirety for all purposes. In some embodiments, the fluid connector 160 may be connected directly to a pressurized water source, such as a faucet or J-pipe.

Figure 2:
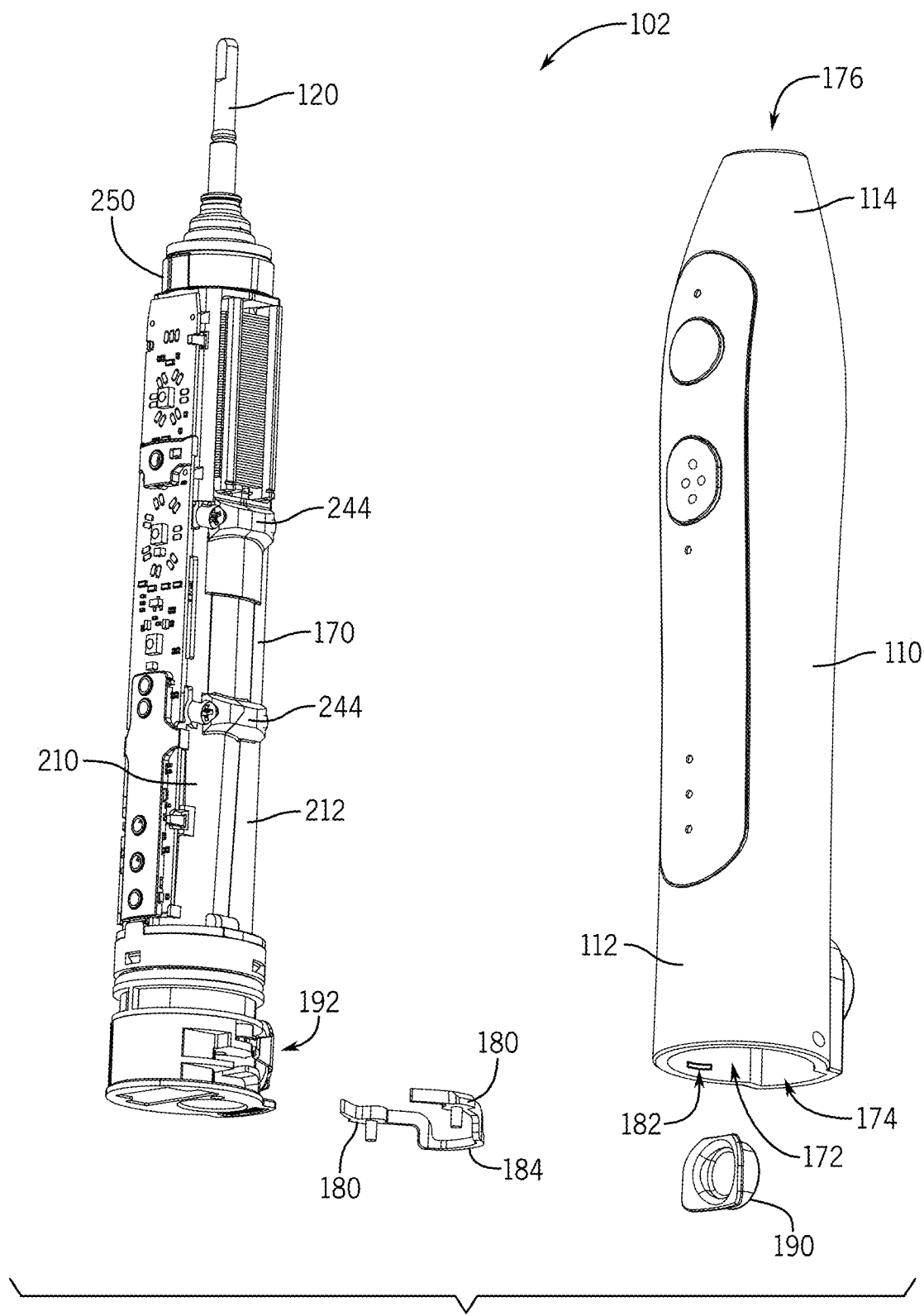
FIG. 2 is an exploded view of a handle of the oral cleansing device in accordance with an embodiment of the disclosure.

FIG. 2 is an exploded view of the handle 102 in accordance with an embodiment of the disclosure. As shown, the oral cleansing device 100 includes a chassis 170 positioned within the handle 102. For example, the chassis 170 may be positioned within the housing 110. In such embodiments, the housing 110 may be hollow or substantially hollow defining an internal cavity 172 in which the chassis 170 is positioned. The housing 110 includes a first opening 174 at the base end 112 through which the chassis 170 is received. In some embodiments, the housing 110 includes a second opening 176 at the brush end 114 through which the drive shaft 120 is received as the chassis 170 is slid into the housing 110 through the first opening 174.

The handle 102 may include one or more features for retaining the chassis 170 within the housing 110. For example, the chassis 170 and housing 110 may include corresponding retention features, such as one or more nubs 180 associated with the chassis 170 that are received within one or more pockets 182 defined in the housing 110 to limit removal of the chassis 170 from the housing 110. The one or more nubs 180 may be defined on the chassis 170 or may be formed as part of a separate retainer element 184 positioned at least partially between the chassis 170 and the housing 110. The chassis 170 may be retained within the housing 110 in a manner similar to that described in U.S. Pat. No. 10,449,023, although other configurations are contemplated.

With continued reference to FIG. 2, the handle 102 may include other features similar to the handle described in U.S. Pat. No. 10,449,023. For instance, the handle 102 may include a latch button 190 operable to selectively release the fluid connector 160 from the handle 102. Specifically, the latch button 190 may allow a user to activate a latch assembly 192 used to selectively secure the fluid connector 160 to the handle 102. The latch assembly 192 may be similar to the latch described in U.S. Pat. No. 10,449,023.

The chassis 170 may house or support one or more components. For example, the chassis 170 may house or support any combination of the power train assembly, a circuit board assembly, a battery assembly, a fluid delivery system, an end cap assembly, or any number of components thereof. The chassis 170 may also house or support various fittings, fasteners, and other components that assist in securing the various components and assemblies together. Generally, the battery assembly provides power to the circuit board assembly, which operates the power train assembly to oscillate the brush head 104 connected thereto. The end cap assembly may fluidically connect the handle 102 to the fluid connector 160, and in some embodiments may serve as a charging device for the battery assembly. The fluid delivery system may fluidically connect the fluid connector 160 to the nozzle 156 of the brush head 104. The power train assembly, the circuit board assembly, the battery assembly, the fluid delivery system, and the end cap assembly may be similar to the corresponding elements and assemblies described in U.S. Pat. No. 10,449,023.

Figure 3:
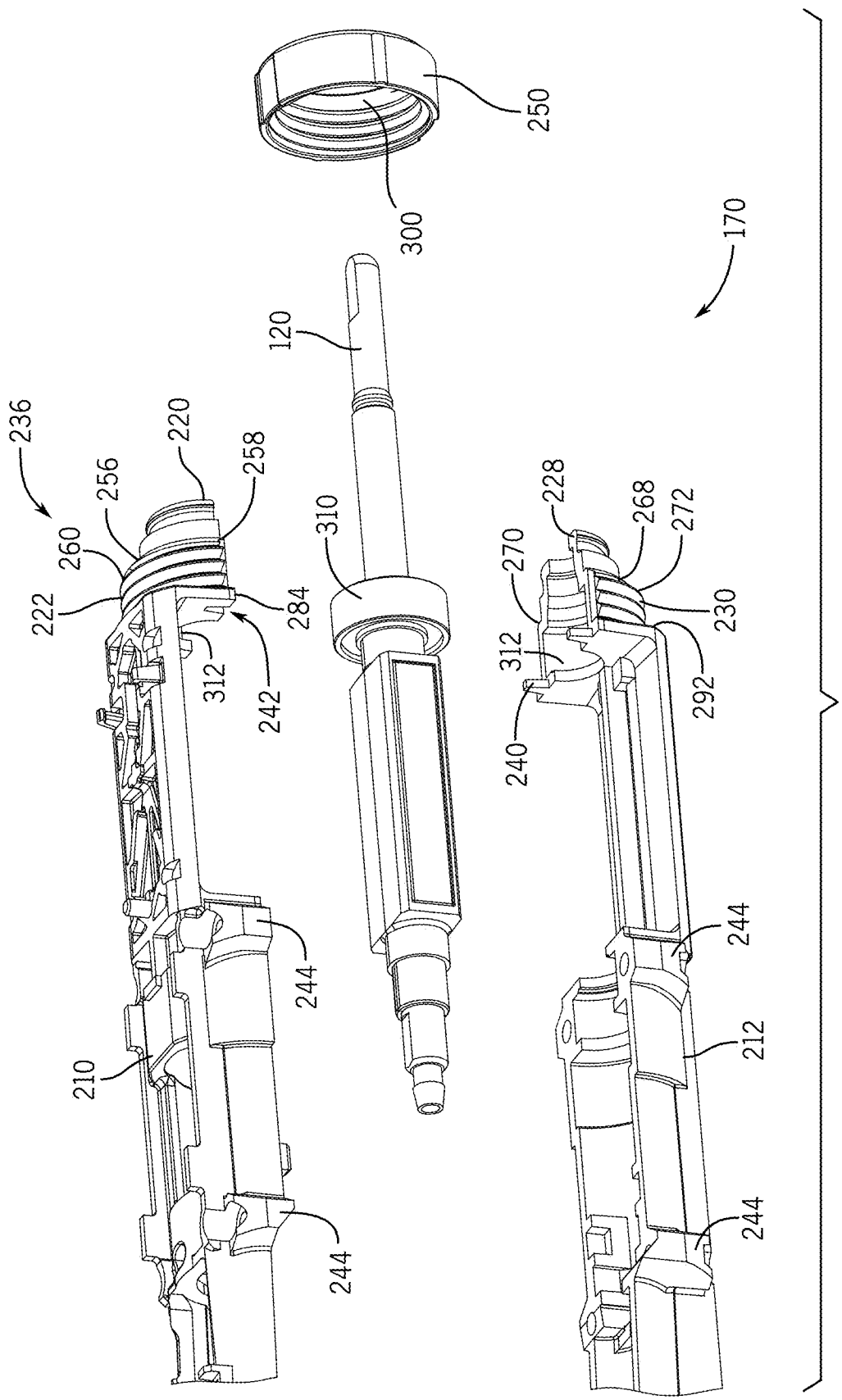
FIG. 3 is an exploded view of a chassis and one or more components of a power train assembly of the oral cleansing device with some features removed for clarity in accordance with an embodiment of the disclosure.

FIG. 3 is an exploded view of the chassis 170 with some features removed for clarity in accordance with an embodiment of the disclosure. Referring to FIG. 3, the chassis 170 may include a first chassis half 210 and a second chassis half 212. The first chassis half 210 may be secured to the second chassis half 212 to enclose or secure at least portions of the power train assembly (e.g., the drive shaft 120), circuit board assembly, battery assembly, fluid delivery system, end cap assembly, or any combination thereof. The first chassis half 210 and the second chassis half 212 may be complementary in size, shape, and features.

The first chassis half 210 may include a first end 220 positioned adjacent to the brush end 114 of the handle 102 when the chassis 170 is received within the housing 110. The first end 220 may include a first threaded portion 222. The first threaded portion 222 may be defined by one or more external threads. Similarly, the second chassis half 212 may include a second end 228 positioned adjacent to the brush end 114 of the handle 102 when the chassis 170 is received within the housing 110. The second end 228 may include a second threaded portion 230. The second threaded portion 230 may be defined by one or more external threads. Each of the first threaded portion 222 and the second threaded portion 230 may form a portion of a thread (e.g., a straight thread or a tapered thread).

Together, the first threaded portion 222 and the second threaded portion 230 define a thread or threaded structure 236 of the chassis 170 when the threaded portions are positioned adjacent each other. For example, the first threaded portion 222 may define a first portion of the thread 236, such as a first half (e.g., upper half, left half, etc.), and the second threaded portion 230 may define a second portion of the thread 236, such as a second half (e.g., lower half, right half, etc.). When the first threaded portion 222 and the second threaded portion 230 are positioned together or adjacent to each other, the threaded portions may define a continuous thread (e.g., thread 236), wherein each threaded portion is needed to complete the continuous thread. Without the second threaded portion 230 of the second chassis half 212, the first threaded portion 222 may be incomplete, partial, or otherwise insufficient to receive a threaded element. Similarly, without the first threaded portion 222 of the first chassis half 210, the second threaded portion 230 may be incomplete, partial, or otherwise insufficient to receive a threaded element.

The first chassis half 210 and the second chassis half 212 may include one or more features that properly locate the first chassis half 210 relative to the second chassis half 212. For example, the first chassis half 210 and the second chassis half 212 may include corresponding retention features that index the first chassis half 210 to the second chassis half 212. In the embodiment illustrated in FIG. 3, one of the first chassis half 210 and the second chassis half 212 (e.g., the second chassis half 212) may include one or more posts 240 that are received within corresponding one or more grooves 242 of the other of the first chassis half 210 and the second chassis half 212 (e.g., the first chassis half 210) to properly position the first chassis half 210 relative to the second chassis half 212. In some embodiments, the first chassis half 210 and the second chassis half 212 may include additional structures or elements securing the first chassis half 210 to the second chassis half 212. For instance, the first chassis half 210 and the second chassis half 212 may include one or more fastener bosses 244 along the length of the first chassis half 210 and the second chassis half 212 for receipt of one or more fasteners (e.g., screws, nuts and bolts, etc.).

As shown in FIGS. 2 and 3, the chassis 170 may include a nut 250 threaded to the first threaded portion 222 and the second threaded portion 230 (the thread 236) to secure the first end 220 of the first chassis half 210 to the second end 228 of the second chassis half 212. For instance, the nut 250 may be threaded to the continuous thread (e.g., thread 236) defined by the first threaded portion 222 and the second threaded portion 230. In one embodiment, the nut 250 includes internal threads that mate with the external threads of the first threaded portion 222 and the second threaded portion 230. When the nut 250 is threaded to the first threaded portion 222 and the second threaded portion 230, the nut 250 may secure the first end 220 of the first chassis half 210 to the second end 228 of the second chassis half 212. For example, when threaded to the first threaded portion 222 and the second threaded portion 230, the nut 250 may limit relative movement between the first chassis half 210 and the second chassis half 212 at the first end 220 and the second end 228, respectively.

Figure 4:
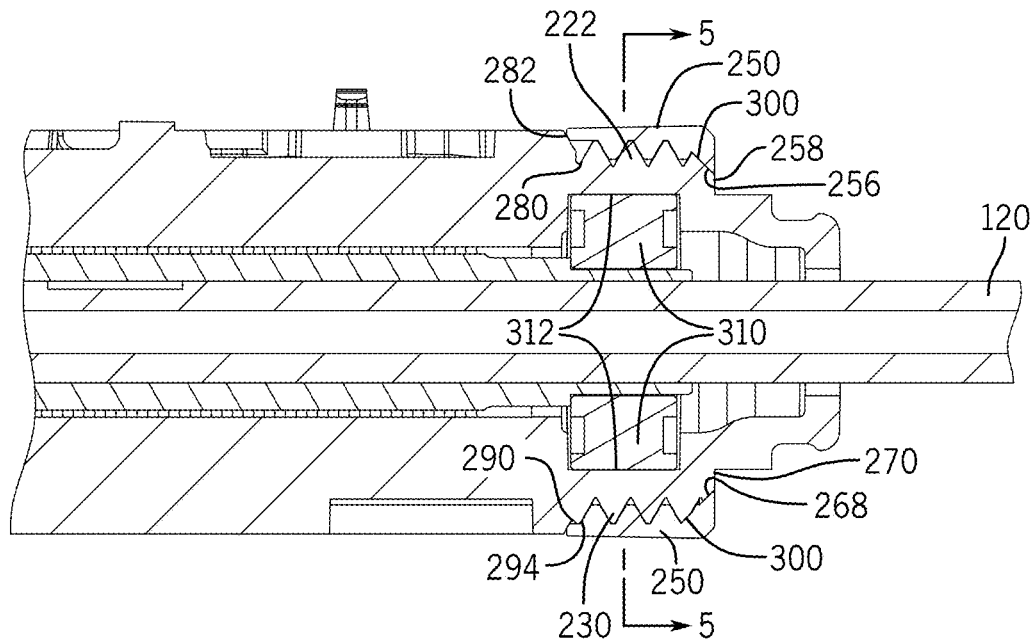
FIG. 4 is a cross-sectional view of the chassis and the one or more components of the power train assembly in accordance with an embodiment of the disclosure.

FIG. 4 is a cross-sectional view of the chassis 170 in accordance with an embodiment of the disclosure. Referring to FIGS. 3 and 4, the first chassis half 210 may include a first chamfered edge 256. The first chamfered edge 256 may define a portion of the first threaded portion 222. The first chamfered edge 256 may be defined on a first shoulder 258 of the first chassis half 210 adjacent to the first threaded portion 222. The first shoulder 258 may be adjacent to a first leading edge 260 of the first threaded portion 222.

The second chassis half 212 may include a similar configuration. For instance, the second chassis half 212 may include a second chamfered edge 268. The second chamfered edge 268 may define a portion of the second threaded portion 230. The second chamfered edge 268 may be defined on a second shoulder 270 of the second chassis half 212 adjacent to the second threaded portion 230. The second shoulder 270 may be adjacent to a second leading edge 272 of the second threaded portion 230. Each of the first chamfered edge 256 and the second chamfered edge 268 may be referred to simply as a chamfer.

In addition or alternatively to the first chamfered edge 256, the first chassis half 210 may include a third chamfer 282 (or third chamfer edge) defined on a third shoulder 284 of the first chassis half 210 adjacent to a first trailing edge 280 of the first threaded portion 222. The second chassis half 212 may include a similar configuration. For example, the second chassis half 212 may include a fourth chamfer 290 (or fourth chamfer edge) defined on a fourth shoulder 292 of the second chassis half 212 adjacent to a second trailing edge 294 of the second threaded portion 230.

The nut 250 may engage the first chamfered edge 256 of the first chassis half 210 and the second chamfered edge 268 of the second chassis half 212. For example, as shown in FIG. 4, the nut 250 may include an interior surface 300, such as a surface that is angled complementarily to the first chamfered edge 256 and the second chamfered edge 268. The interior surface 300 may engage the first chamfered edge 256 and the second chamfered edge 268 when the nut 250 is screwed onto the first threaded portion 222 and the second threaded portion 230. In such embodiments, the nut 250 (e.g., the interior surface 300) may be tightened onto the first chamfered edge 256 and the second chamfered edge 268.

Engagement of the nut 250 with the first chamfered edge 256 and the second chamfered edge 268 may provide one or more functional features. For instance, engagement of the nut 250 with the first chamfered edge 256 and the second chamfered edge 268 may define a fully seated or tightened position of the nut 250 on the chassis 170. In some embodiments, engagement of the nut 250 with the first chamfered edge 256 and the second chamfered edge 268 may tighten the first chassis half 210 to the second chassis half 212, such as compressing the first chassis half 210 and the second chassis half 212 together. For example, engagement of the interior surface 300 of the nut 250 with the first chamfered edge 256 and the second chamfered edge 268 may wedge the first end 220 of the first chassis half 210 and the second end 228 of the second chassis half 212 together. In this manner, tightening the nut 250 against the first chamfered edge 256 and the second chamfered edge 268 may function as a taper lock to compress the first chassis half 210 and the second chassis half 212 together.

The nut 250 may engage the third chamfer 282 and the fourth chamfer 290 in a manner similar to the engagement of the nut 250 with the first chamfered edge 256 and the second chamfered edge 268 described above. For example, the nut 250 may engage the third chamfer 282 and the fourth chamfer 290 in addition to engaging the first chamfered edge 256 and the second chamfered edge 268, thereby creating a primary engagement of the nut 250 with the first and second chamfered edges 256, 268 and a secondary engagement of the nut 250 with the third and fourth chamfers 282, 290. In some embodiments, the nut 250 may engage only the first chamfered edge 256 and the second chamfered edge 268 without engaging the third chamfer 282 or the fourth chamfer 290, or alternatively may engage only the third chamfer 282 and the fourth chamfer 290 without engaging the first chamfered edge 256 and the second chamfered edge 268. Engagement of the nut 250 with the third chamfer 282 and the fourth chamfer 290 may wedge the first end 220 of the first chassis half 210 and the second end 228 of the second chassis half 212 together, such as in a taper lock configuration. In some embodiments, the nut 250 may be sized and shaped such that clearance exists between the nut 250 and the third and fourth chamfers 282, 290 (or between the nut 250 and the third and fourth shoulders 284, 292).

The first chassis half 210 and the second chassis half 212 may receive one or more components of the power train assembly. For instance, as shown in FIGS. 3 and 4, the power train assembly may include the drive shaft 120 and a bearing 310 rotatably supporting the drive shaft 120. The bearing 310 may be an off-the-shelf ball bearing suitable for oscillating movement of the drive shaft 120.

As shown, the bearing 310 may be positioned between the first threaded portion 222 of the first chassis half 210 and the second threaded portion 230 of the second chassis half 212. For example, a bearing seat 312 may be defined in an interior surface of each of the first chassis half 210 and the second chassis half 212 below (e.g., radially inward from) the first threaded portion 222 and the second threaded portion 230. In this manner, the first threaded portion 222 and the second threaded portion 230 may combine to create the bearing seat 312 to receive the bearing 310. For example, when the first chassis half 210 and the second chassis half 212 are secured together, the bearing seat 312 defined by the first threaded portion 222 and the second threaded portion 230 may receive a portion of the bearing 310, such as an outer race of the bearing 310.

Figure 5:
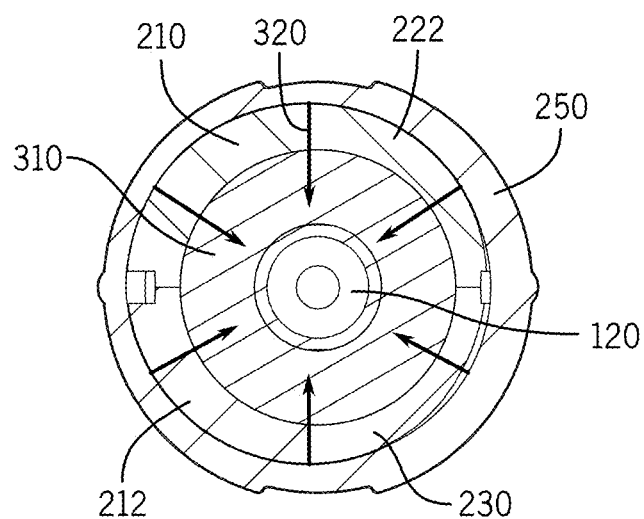
FIG. 5 is a cross-sectional view of the chassis and the one or more components of the power train assembly taken along line 5-5 of FIG. 4 in accordance with an embodiment of the disclosure.

FIG. 5 is a cross-sectional view of the chassis 170 taken along line 5-5 of FIG. 4 in accordance with an embodiment of the disclosure. Referring to FIG. 5, the nut 250 may provide an inwardly-directed radial force 320 against the chassis 170. For example, engagement of the nut 250 with the first chamfered edge 256 and the second chamfered edge 268 may produce the inward radial force 320 against the first chassis half 210 and the second chassis half 212. In some embodiments, the radial force 320 may be uniform or substantially uniform. The radial force 320 may reduce localized stresses in connecting the first chassis half 210 to the second chassis half 212 compared to other designs utilizing fasteners (e.g., screws, nuts and bolts, etc.). For example, the radial force 320 may distribute a clamping force across a larger surface area compared to other designs, such as uniformly or substantially uniform across the first chassis half 210 and the second chassis half 212. In some embodiments, the radial force 320 produced by engagement of the nut 250 with the chassis 170 may produce a greater clamping force compared to other designs.

Although the radial force 320 is described resulting from engagement of the nut 250 with the first chamfered edge 256 of the first chassis half 210 and the second chamfered edge 268 of the second chassis half 212, the radial force 320 may be produced by other configurations. For example, at least one of the thread 236 of the chassis 170 or the nut 250 may include a tapered thread, such that tightening of the nut 250 onto the thread 236 produces the inwardly-directed radial force 320.

As shown in FIGS. 4 and 5, at least a portion of each of the nut 250, the first threaded portion 222, the second threaded portion 230, and the bearing 310 may lie in a cross-sectional plane of the chassis 170. In this manner, the inward radial force 320 may be directed from the nut 250 to the first and second threaded portions 222, 230 and onto the bearing 310 or adjacent to the bearing 310 to reduce stresses within the first chassis half 210 and the second chassis half 212. The cross-sectional plane may be defined orthogonal to a longitudinal axis of the chassis 170. For example, the cross-sectional plane may be defined by line 5-5 in FIG. 4.

All relative and directional references (including top, bottom, side, front, rear, and so forth) are given by way of example to aid the reader's understanding of the examples described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

The present disclosure teaches by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. An oral cleansing device comprising:
   a first chassis half comprising a first threaded portion;
   a second chassis half comprising a second threaded portion; and
   a nut threaded onto the first threaded portion and the second threaded portion to at least partially secure the first chassis half to the second chassis half;
   wherein:
   the first chassis half comprises a first chamfer adjacent to the first threaded portion;
   the second chassis half comprises a second chamfer adjacent to the second threaded portion; and
   the nut engages the first chamfer and the second chamfer to compress the first chassis half and the second chassis half together.

2. The oral cleansing device of claim 1, wherein the nut provides a uniform radial force against the first chassis half and the second chassis half.

3. The oral cleansing device of claim 1, wherein:
   the first chamfer is defined on a first shoulder of the first chassis half;
   the second chamfer is defined on a second shoulder of the second chassis half; and
   an interior surface of the nut engages the first chamfer and the second chamfer.

4. The oral cleansing device of claim 3, wherein:
   the first chassis half comprises a third chamfer defined on a third shoulder of the first chassis half;
   the second chassis half comprises a fourth chamfer defined on a fourth shoulder of the second chassis half; and
   the nut engages the third chamfer and the fourth chamfer.

5. The oral cleansing device of claim 1, wherein engagement of the nut with the first chamfer and the second chamfer defines a fully tightened position of the nut.

6. The oral cleansing device of claim 1, further comprising:
   a drive shaft; and
   a bearing rotatably supporting the drive shaft, the bearing positioned between the first threaded portion of the first chassis half and the second threaded portion of the second chassis half.

7. An oral cleansing device comprising:
   a handle; and
   a chassis positioned within the handle, the chassis comprising:
   a first chassis half comprising a first end with a first threaded portion;
   a second chassis half comprising a second end with a second threaded portion; and
   a nut threaded onto the first threaded portion and the second threaded portion to secure the first end of the first chassis half to the second end of the second chassis half;
   wherein the nut engages a first chamfered edge of the first chassis half and a second chamfered edge of the second chassis half, such that engagement of the nut with the first chamfered edge and the second chamfered edge produces a radial force against the first chassis half and the second chassis half.

8. The oral cleansing device of claim 7, wherein:
   the first chamfered edge is defined on a first shoulder of the first chassis half adjacent to the first threaded portion; and the second chamfered edge is defined on a second shoulder of the second chassis half adjacent to the second threaded portion.

9. The oral cleansing device of claim 8, wherein:
the first shoulder is adjacent to a first leading edge of the first threaded portion; and
the second shoulder is adjacent to a second leading edge of the second threaded portion.

10. The oral cleansing device of claim 8, wherein:
the first shoulder is adjacent to a first trailing edge of the first threaded portion; and
the second shoulder is adjacent to a second trailing edge of the second threaded portion.

11. The oral cleansing device of claim 7, further comprising:
a drive shaft; and
a bearing rotatably supporting the drive shaft, the bearing positioned between the first threaded portion of the first chassis half and the second threaded portion of the second chassis half.

12. The oral cleansing device of claim 11, wherein at least a portion of each of the nut, the first threaded portion, the second threaded portion, and the bearing lie in a cross-sectional plane.

13. A chassis for an oral cleansing device, the chassis comprising:
a first chassis half comprising a first end with a first threaded portion;
a second chassis half comprising a second end with a second threaded portion, the first threaded portion and the second threaded portion together defining a threaded structure; and
a nut threaded onto the threaded structure to secure the first end of the first chassis half to the second end of the second chassis half;
wherein the nut engages a first chamfered edge of the first chassis half and a second chamfered edge of the second chassis half, such that engagement of the nut with the first chamfered edge and the second chamfered edge produces a radial force against the first chassis half and the second chassis half, the first chamfered edge defined on a first shoulder of the first chassis half adjacent to the first threaded portion, the second chamfered edge defined on a second shoulder of the second chassis half adjacent to the second threaded portion.

14. The chassis of claim 13, wherein:
the first shoulder is adjacent to a first leading edge of the first threaded portion; and
the second shoulder is adjacent to a second leading edge of the second threaded portion.

15. The chassis of claim 13, wherein engagement of the nut with the first chamfered edge and the second chamfered edge provides a uniform radial force against the first chassis half and the second chassis half.

16. The chassis of claim 13, wherein at least a portion of the first threaded portion, the second threaded portion, and the nut lie in a cross-sectional plane defined orthogonal to a longitudinal axis of the chassis.

17. The chassis of claim 13, wherein the first threaded portion and the second threaded portion combine to create a bearing seat to receive a bearing.

18. An oral cleansing device comprising:
a handle; and
the chassis of claim 13, the chassis positioned within the handle.

19. An oral cleansing device comprising:
a handle;
a chassis positioned within the handle, the chassis comprising:
a first chassis half comprising a first end with a first threaded portion;
a second chassis half comprising a second end with a second threaded portion; and
a nut threaded onto the first threaded portion and the second threaded portion to secure the first end of the first chassis half to the second end of the second chassis half;
a drive shaft; and
a bearing rotatably supporting the drive shaft, the bearing positioned between the first threaded portion of the first chassis half and the second threaded portion of the second chassis half.

20. The oral cleansing device of claim 19, wherein at least a portion of each of the nut, the first threaded portion, the second threaded portion, and the bearing lie in a cross-sectional plane.

* * * * *